No. 806,109. PATENTED DEC. 5, 1905.
A. W. COPLAND.
DEPOSITING MACHINE.
APPLICATION FILED NOV. 7, 1904.
5 SHEETS—SHEET 1.
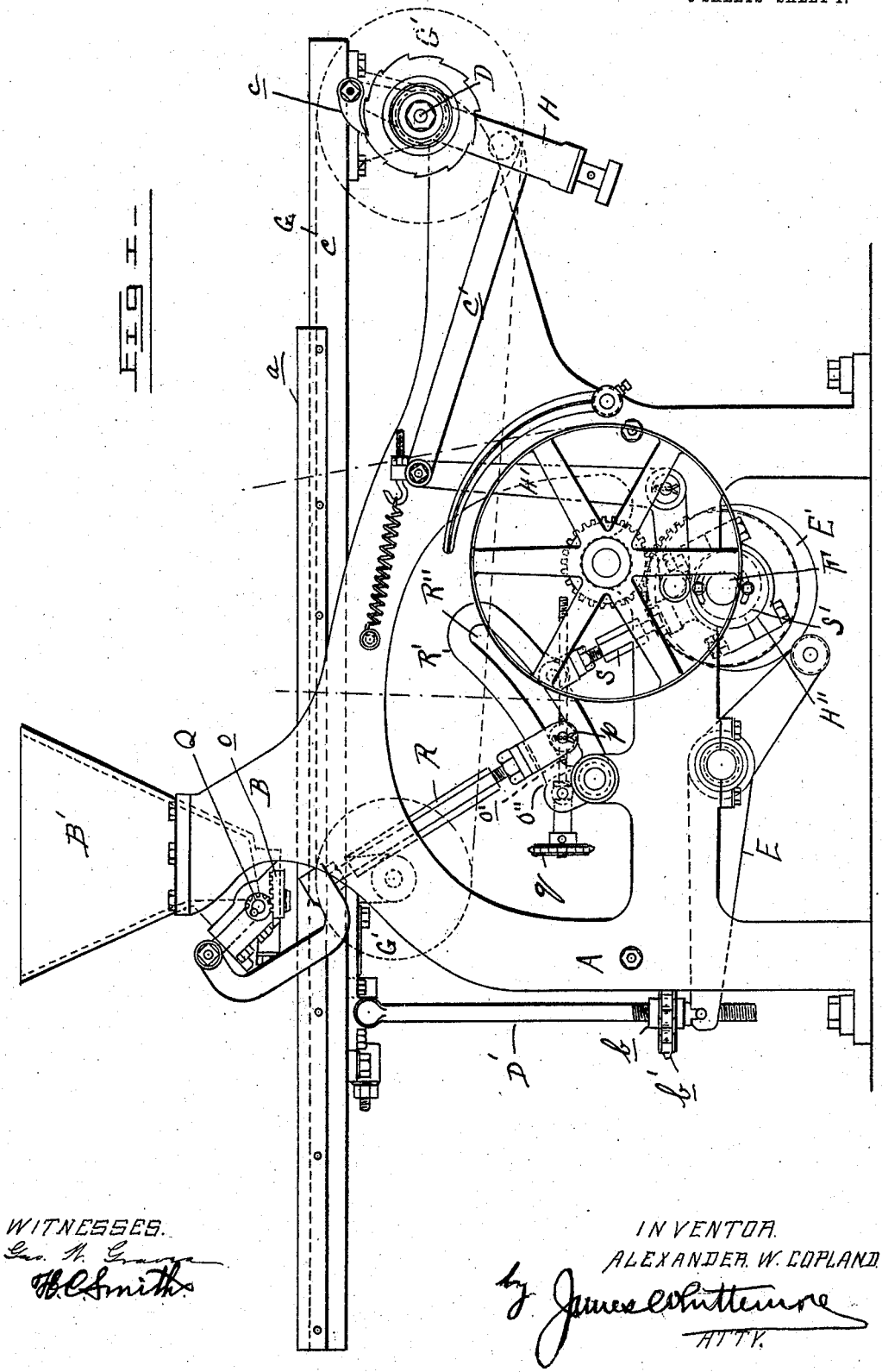
WITNESSES.
Geo. N. Grange
H. C. Smith
INVENTOR.
ALEXANDER W. COPLAND
by James C. Whittemore
ATTY.

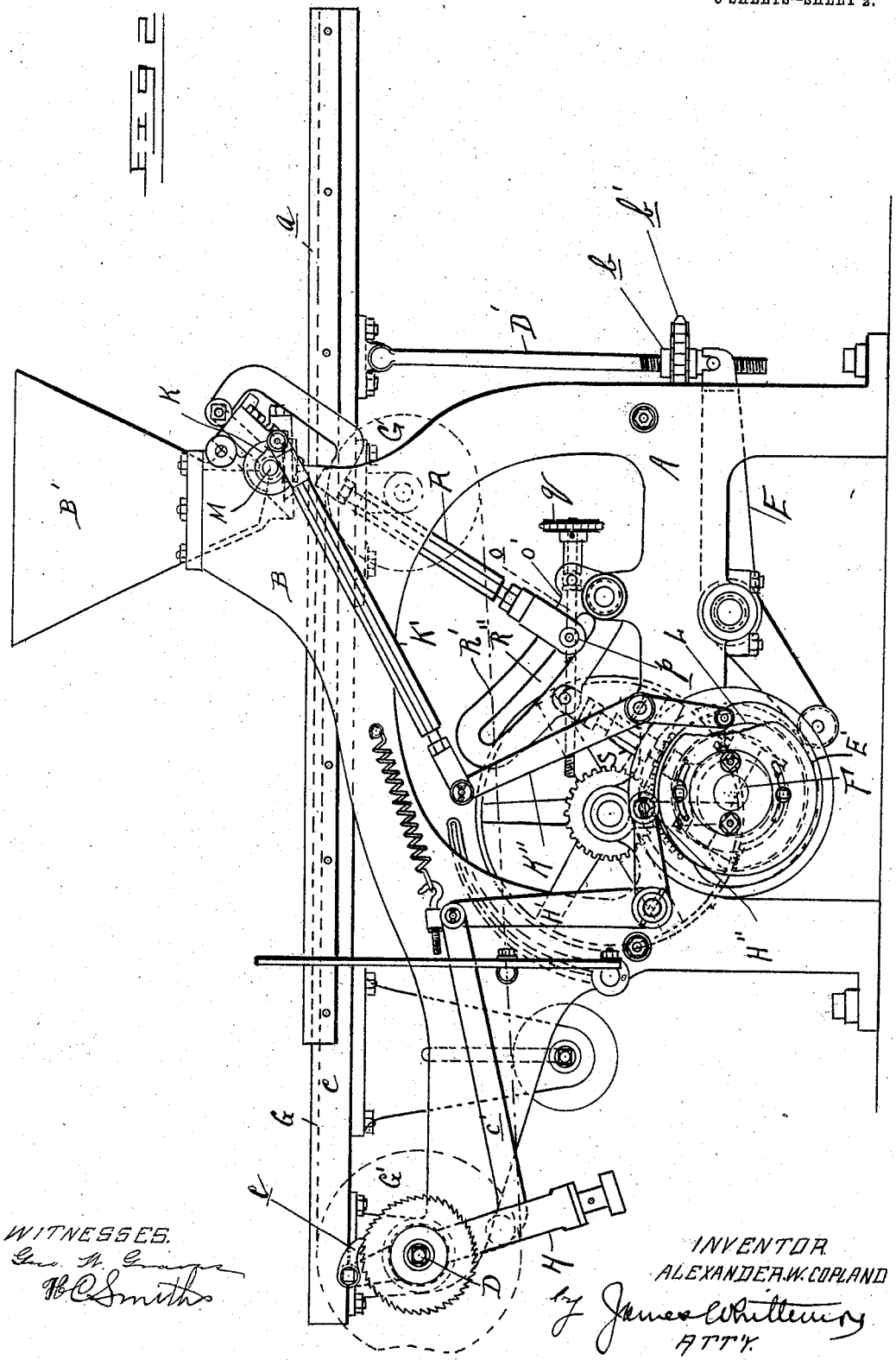

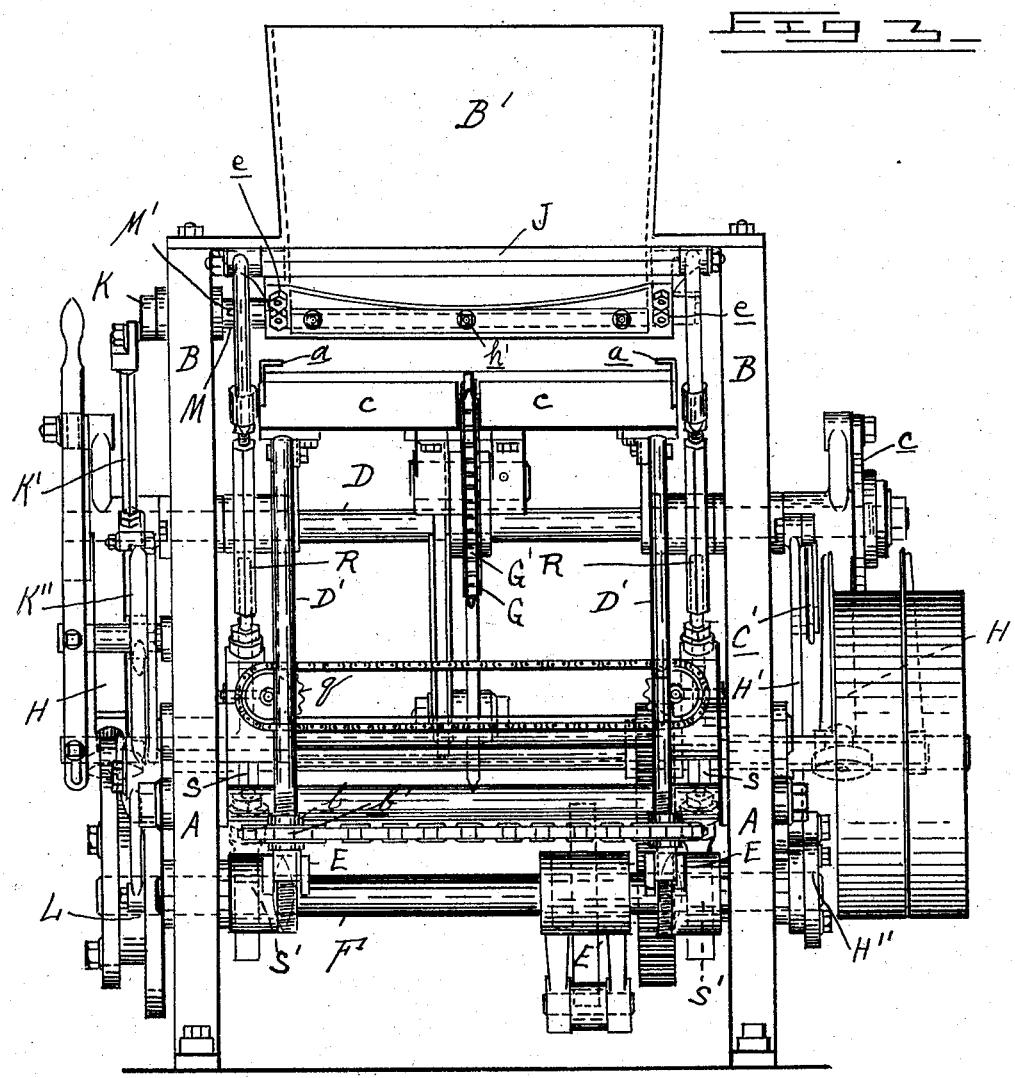

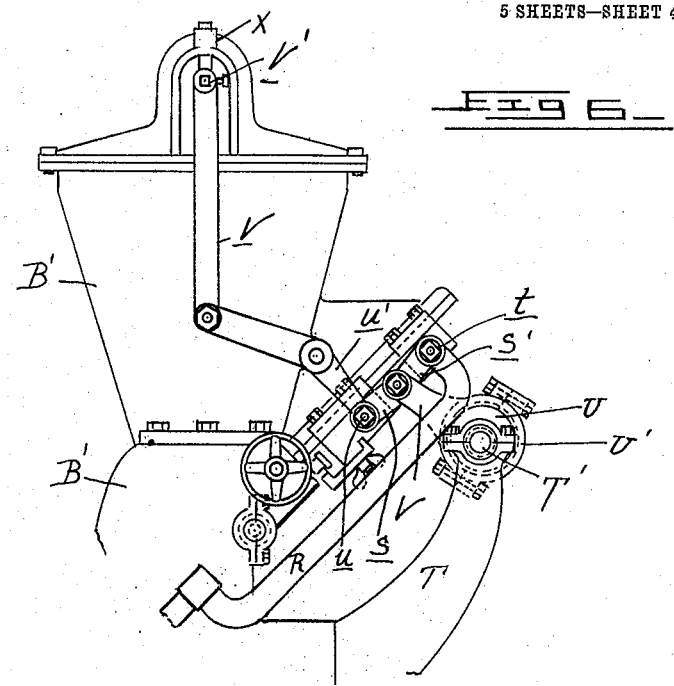
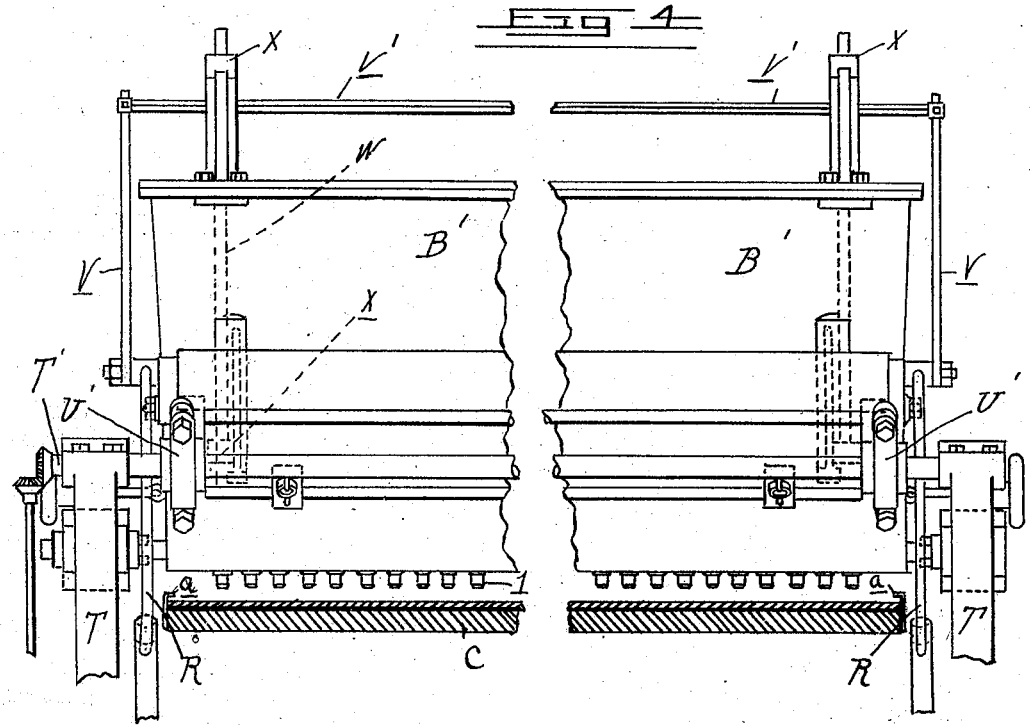

No. 806,109. PATENTED DEC. 5, 1905.
A. W. COPLAND.
DEPOSITING MACHINE.
APPLICATION FILED NOV. 7, 1904.
5 SHEETS—SHEET 5.
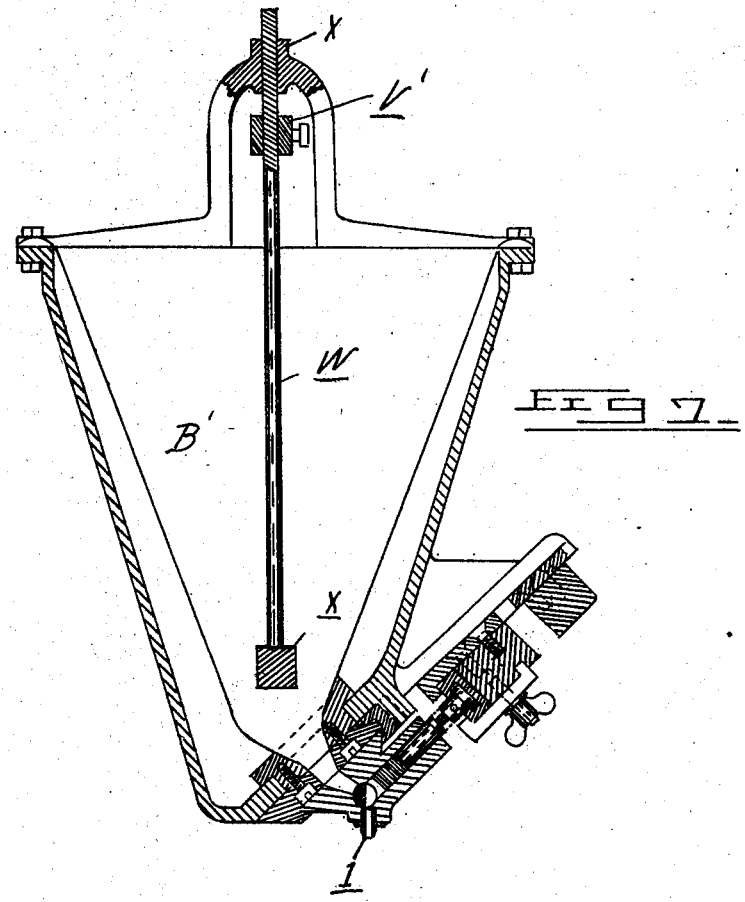
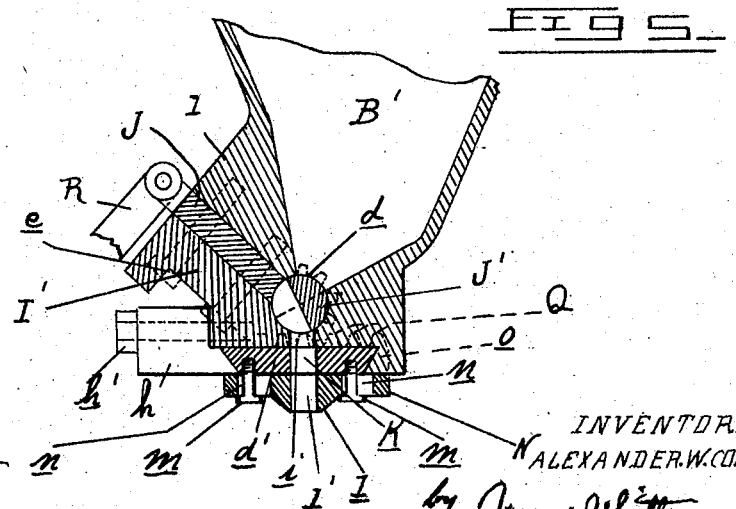
WITNESSES
INVENTOR.
ALEXANDER W. COPLAND
ATT'Y.

UNITED STATES PATENT OFFICE.

ALEXANDER W. COPLAND, OF DETROIT, MICHIGAN.

DEPOSITING-MACHINE.

No. 806,109. Specification of Letters Patent. Patented Dec. 5, 1905.

Application filed November 7, 1904. Serial No. 231,721.

*To all whom it may concern:*

Be it known that I, ALEXANDER W. COPLAND, a citizen of the United States, residing at Detroit, in the county of Wayne and State of Michigan, have invented certain new and useful Improvements in Depositing-Machines, of which the following is a specification, reference being had therein to the accompanying drawings.

The invention relates to new and useful improvements in depositing-machines; and it consists in the construction of a machine intended particularly for depositing soft dough, such as sponge-cake, macaroons, melted fondant, or chocolate, and comprises a hopper for the material, a cylinder having its discharge-opening adjacent to the discharge from the hopper, and an apertured member arranged adjacent to the hopper and cylinder, combined with a valve for directly connecting the hopper and cylinder or the cylinder and the discharge-ports through the apertured member.

The invention also relates to a construction of machine for the relative movement between the deposited material and the hopper or nozzle, whereby the thread connecting the material in the nozzle and the deposited material will be laid back upon the deposit.

The invention also consists in the construction of the piston-operating means, whereby the piston is operated with a succession of strokes or shocks, which it is found in practice prevents the compacting or the setting of the material, and, further, in the construction, arrangement, and combination of the various parts, as more fully hereinafter described, and particularly pointed out in the claims.

In the drawings, Figure 1 is a side elevation of my machine. Fig. 2 is a side elevation of the opposite side of the machine. Fig. 3 is an end elevation looking toward the right-hand end of Fig. 2. Fig. 4 is an elevation of the hopper and connecting parts. Fig. 5 is a vertical section through the hopper, cylinder, valve, and discharge plate and nozzle. Fig. 6 is an end elevation of the hopper, showing a piston-operating device, with means to impart a tremulous motion thereto. Fig. 7 is a vertical section through Fig. 6, the hopper in this construction being a jacketed hopper, such as is used in handling chocolate.

In the prior state of the art depositing-machines have been made, but difficulty has been experienced with such machines in depositing certain kinds of dough or confectionery—such, for instance, as sponge-cake, macaroon, &c.—and also greater difficulty has been experienced in the handling of chocolate, because the compressing action of the piston tends to drive out the oil of the chocolate and cause it to cake or harden. These difficulties in handling dough or chocolate have also been increased by the use of machines having tortuous passages, in which various changes of direction were required in transferring the material from the receptacle through the exit-nozzle, and churning or material compression occurred during such operation, which either destroyed the lightness of the dough or, as before described, would compact or harden the chocolate. My machine has demonstrated that it overcomes this objection and that the lightest and most delicate kinds of dough can be deposited therewith in practically any desired shape and also that chocolate can be satisfactorily handled thereby.

A is the base of the machine, which supports the operating parts. At the sides of the frames are the standards B, in which is supported the hopper B', extending transversely over the top or table C, having the side guides $a$, between which the pans containing the material are adapted to be fed. The table C is pivoted on a shaft D, extending transversely between the sides of the frame, and its opposite end is supported on the links D', which are supported on the crank-levers E, having a roller engagement with the cam E' on the drive-shaft F. These links D' are on opposite sides of the table and are adjustable in length by means of the nuts $b$ engaging a screw-threaded portion of the links and which are geared together, preferably by means of the sprocket-wheels $b'$ and a suitable connecting sprocket-chain, so that both may be adjusted alike simultaneously. The cam E' is of suitable shape to raise and lower the table upon its pivot D to and from the discharge from the hopper B'.

G is an endless carrier extending from the pivoted end of the table to a point beneath the hopper. This carrier travels over the wheels G' and is intermittently fed forward by means of a pawl $c$ on the lever H, journaled on the shaft D and connected by a link $c'$ with a bell-crank lever H', having the roller connection with the cam H'', also on the drive-shaft F.

The base of the hopper is provided with an inclined block I, upon which is bolted what I will call, for convenience, the "cylinder" I'. The cylinder in this case is of a shape to receive a flat narrow piston J, extending the whole length of the cylinder, and the block I forms the inner face of the cylinder, while the cylinder-casting I' forms the other three sides thereon, being secured in position by means of suitable bolts $e$. The discharge from and the inlet to the cylinder is formed at the inner end, and this port is arranged in close proximity to the port $d$, forming the outlet from the receptacle or hopper B'. Below the discharge from the cylinder is a member which carries the discharge-ports and which in this case I have shown as a plate $d'$, having beveled edges, one edge fitting in an inclined bearing in the base of the hopper and the other edge being clamped in position by the clamping-bar $h$, having bolts $h'$ entering into the lower part of the cylinder. The plate $d'$ has a series of ports $k$, which register with the slot $i$, formed between the lower edge of the cylinder and the base of the hopper. At the juncture of the cylinder discharge-port and the discharge-port from the hopper and above the perforated plate $d'$, adjacent to the perforations therein, I locate a three-way valve, which in this case I have shown as a rotary valve J', being semicircular in cross-section in its valve portion and journaled in suitable bearings at its ends. This valve by a partial rotation is adapted to connect the hopper and the cylinder or the cylinder and the discharge-ports in the perforated plate. This construction permits of a direct connection between two of these three ports, which may be made quite large and free and which does not necessitate the material passing through tortuous or narrow channels or passages, and therefore allows its travel with the smallest amount of friction and the least possible churning or compacting thereby, as hereinbefore described, permitting the handling of light dough or chocolate. The valve J' is operated by means of a crank K, secured to the end of the stub-shaft M, which has a slotted bearing engaging a tongue M' on the end of the valve-shaft. This crank is connected by a connecting-rod K' with the lever K", this lever having a roller connection with a suitable cam L on the shaft F, so that at the proper interval the valve is rocked to connect the cylinder with the hopper and shut off the discharge-port or to shut off the hopper and connect the cylinder with the discharge-port. It will be seen that with this construction by simply removing the bolts $e$ the cylinder, perforated plate, and the valve may all be removed, disclosing the discharge from the hopper, so that all these parts may be removed for cleaning, repair, or adjustment.

While I have shown a single piston for all of the ports in the perforated plate $d'$, it is obvious that I can with the same construction, if desired, put in separate pistons therefor, although I prefer to use a single piston for the reason that it reduces the friction and enables me to make large, wide, plain ports or passages, the only constriction being in the passage of the material through the perforations of the plate $d'$.

On the under side of the plate $d'$ is secured the plate N. This plate is as shown in Fig. 5, having a series of nozzles $l$ surrounding the apertures $l'$, which register with the port $k$ in the plate $d'$. The plate N has a sliding engagement in relation to the plate $d'$, and this is accomplished by making any desired sliding connection between the two parts. I have shown the screws $m$ passing through slots $n$ in the plate N and entering the plate $d'$ to hold the parts close together and still permit the sliding movement. The plate N is provided at each end with rack-bars $o$, which preferably extend slightly above the surface of the plate $d'$. On each end of the valve-shaft I provide the tooth portion Q, adapted to engage the rack-bar, so that as the valve-shaft is operating the valve J' the plate, with its nozzles, will be reciprocated. This movement of the nozzle-plate does two things: It cuts off the material which is in the ports $i$ and $k$, so that the only possible material which can drip is that which is in the nozzle itself, and it also is moved back over the material which has been deposited. For instance, in depositing such material as "lady-fingers" or other material which is to be deposited with a considerable length, during the time that the valve is open and the material is being discharged through the nozzle on the pans on the carrier, the pans or carrier are caused to be moved so that the material will be deposited over more or less space on the pan or carrier. Now when the desired amount has been deposited and the valve is closed the nozzle is reciprocated over the deposited material—that is, in the same direction as the table has previously been traveling—and this distributes over the top of the deposit the thread or connection between the material in the nozzle and that which has been deposited in it, also severing that thread. This lays the thread so nicely on top of the deposit that it coalesces with the mass and does not show. It also prevents the dragging of the thread from one deposit to the next one, and thus facilitates clean-cut and even work. In some dough the thread will not be broken by this forward movement of the nozzle in relation to the deposit; but the material of the thread will be largely spread upon the deposit, and then when the table lowers the thread will be so fine that it will readily break without disfiguring the deposited dough or the article to be baked therefrom.

The piston is reciprocated by the following mechanism: In Fig. 1 I have shown a positively-driven piston moving in continuous movement in the ordinary manner of piston movements. In that construction the piston is connected through the adjustable connecting-rod R at each end. These rods are connected to the lever R', which has a curved slot R'', in which the end of the rod R is adjustably connected. I have shown the adjustment for this rod in the slot by means of the adjusting-screws o', which are secured in the pivoted block o'' and engage a screw-threaded bearing in the pivoted block p in the end of the rod R. These screws for each rod are provided with sprocket-wheels q, which are connected together by a sprocket-chain, so that both may be adjusted simultaneously and alike. The lever R' is connected by the connecting-rod S with an eccentric S' on the shaft F.

I find for some kinds of dough, especially for chocolate dough, that it is desirable to have a progressive or intermittent movement or an intermittent endwise vibration of the piston, and to accomplish this I may use the same connection already described from the eccentric to the connecting-rod R, but make a special connection between the connecting-rod and the piston itself. In this construction I provide brackets T, in which is journaled the shaft T', having thereon at each end the eccentrics U with the eccentric-strap U' and the connecting-rod V. This connecting-rod connects to the middle joint of two double toggle-levers s and s'. The outer joint of the toggle-lever s' is connected to the pivot-pin t, to which the connecting-rod R is also preferably connected, and the lower end of the toggle-lever s is connected to the outer end of the piston. The drive-shaft T' is driven by any suitable connection to the drive mechanism in the machine, but is rapidly rotated, so that as the piston is driven back and forth by the connecting-rod R the middle joint of the toggle-levers is moved in and out, thereby giving a series of intermittent impulses or vibrations to the piston, which I have discovered will not compact or crystallize the chocolate, which thus can be fed through the nozzle and deposited on the table in any desired size and shape, according to the size and shape of the nozzles and pistons.

I find it desirable also with chocolate to provide an agitator or pusher at the bottom of the hopper and also to give this pusher the same vibration that is given to the piston to prevent the crystallization or hardening of the chocolate by the action thereof. In using this I may employ the following construction: On the pin u, forming the lower joint of the toggle-lever s, at the point it connects with the piston I connect a crank-lever u', journaled on the side of the hopper and connected to the links v, which connect to a suitable cross-head v' at the top of the hopper, and from this cross-head descends the rod w, suitably guided in bearings x at its upper end. Near the discharge end of the hopper is the pusher-plate x. The movement of this pusher is so timed that at the time the valve connects the hopper with the cylinder the pusher is going downwardly, having this vibrating motion, and at the time that the hopper is shut off and the valve connects the cylinder with the exit-port through the nozzle the plate x is rising. This insures a proper and full discharge of the chocolate into the cylinder and from the cylinder onto the pan or table.

I have shown a jacketed hopper in Fig. 7 and the necessary changes in the discharge-ports and have also omitted the reciprocating nozzle-plate simply to show that this tremulous-motion piston is not necessarily limited to details of the other parts previously described.

The parts being thus constructed, their operation is as follows: The machine being started in operation and pans being supplied onto the carrier extending beneath the nozzles, the valve being first turned so as to connect the cylinder and hopper, the outer movement of the piston will fill the cylinder with the material. The valve is then shifted to connect the cylinder with the discharge-port, and at the same time the nozzle is moved into registration with such ports and the material deposited upon the pan or carrier. During this depositing if an elongated deposit is to be made the carrier will feed forward. When the deposit has been made, the nozzle will be reciprocated forward in its cut-off movement, and at the same time the valve is shifting to connect the cylinder with the hopper, and in its forward movement the thread will be laid upon the top of the deposit. The table now lowers and feeds forward the proper distance to leave a space for the succeeding deposit and the operation is repeated.

While I have shown and described a movable nozzle in this construction, it is obvious that the machine is desirable and can be used with a plain nozzle, as shown, for instance, in Fig. 7, for certain kinds of work, and I do not desire to be limited to such construction except where so specified in the claims.

What I claim as my invention is—

1. In a depositing-machine, the combination of a material-receptacle having a discharge-port at its lower end, a cylinder arranged with its end adjacent to the discharge of the receptacle, a member below these two and having perforations adjacent to the ports in the lower ends of the receptacle and cylinder, a valve interposed at the juncture of these three passages, means for moving the valve to directly connect the receptacle and cylinder, or the cylinder and discharge-ports, and a piston in the cylinder.

2. In a depositing-machine having a receptacle having a discharge-passage, a cylinder and piston and a perforated depositing-plate, the discharge-ports thereof arranged in proximity, a valve arranged at the juncture of the said ports, having a passage therethrough, means for moving said valve to cause said passage to connect the receptacle and cylinder, or to connect the cylinder and the perforations in the plate.

3. In a depositing-machine, the combination of a discharge-spout, feed mechanism for intermittently depositing charges of batter or dough therefrom, and mechanism for effecting a relative movement forward and reverse between the discharge-spout and the deposited dough.

4. In a depositing-machine, the combination of a discharge-spout, feed mechanism for intermittently discharging charges of batter or dough therefrom, and mechanism for causing the nozzle to move laterally over the charge, to thereby break the connecting-thread and lay it upon the deposited dough.

5. In a depositing-machine, the combination of a movable carrier to receive the deposit, a receptacle, a discharge-spout from the receptacle adapted to intermittently discharge deposits upon the carrier, and means for effecting a relative movement forward and reverse between the deposit on the carrier and nozzle.

6. In a depositing-machine, the combination of an apron having an intermittent forward feed movement, a discharge-nozzle above the apron through which deposits are adapted to be intermittently made on the apron, and means for moving the nozzle back over the dough, such movement being in the same direction as the feed movement of the apron.

7. In a depositing-machine, the combination of a vertically-movable table and feed devices for the material thereon, a receptacle, a discharge-spout above the table, and means for effecting an intermittent discharge of deposits upon the table, means for effecting a relative movement forward and reverse between the table and spout, and means for lowering the table from the spout and feeding the deposited material forward after each deposit.

8. In a depositing-machine, the combination of the receptacle, cylinder, piston, and perforated plate with mechanism for connecting the receptacle and cylinder, and the cylinder and perforations in the plate, a movable nozzle, and means for moving the nozzle into and out of registration with the perforations in the plate.

9. In a depositing-machine, the combination of the receptacle, cylinder, plunger, perforated plate and a valve, means for moving the valve to connect the receptacle and cylinder, and the cylinder and the perforation in the plate, of a movable nozzle below the plate and means for operating the nozzle by the valve-operating means.

10. In a depositing-machine, the rotary three-way valve, a toothed wheel thereon, a sliding nozzle, and a rack on the nozzle for operating the nozzle by and upon the operation of the valve.

11. In a depositing-machine, the combination of a receptacle, a cylinder, its piston, piston-operating means, and a discharge-port, means for alternatively connecting the receptacle and cylinders, and the cylinder and discharge-port, and means for effecting a vibration of the material during the discharge movement of the piston.

12. In a depositing-machine, the combination of a receptacle, a cylinder, its piston, piston-operating means and a discharge-port, of means for alternately connecting the receptacle and cylinder and the cylinder and discharge-port, and means for vibrating the piston during the discharge movement thereof.

13. In a depositing-machine, the combination of a receptacle, a cylinder, its piston, piston-operating means, and a discharge-port, of means alternately connecting the receptacle and cylinder and the cylinder and discharge-port, and means for longitudinally vibrating the piston during its discharge movement.

14. In a depositing-machine, the combination of a receptacle, a cylinder, its piston, piston-operating means, and a discharge-port, of means for alternately connecting the receptacle and cylinder, and the cylinder and discharge-port, toggle-levers connecting the piston-operating means and piston, and means for reciprocating the middle joint of said toggle-levers during the travel of the piston for the purpose described.

15. In a depositing-machine, the combination of a materials-receptacle, a cylinder and piston, and a discharge-passage, means for connecting the receptacle and cylinder, or the cylinder and discharge-passage, of an agitator for the material in the receptacle, and means for causing said agitator to press the material downward as the piston withdraws.

16. In a depositing-machine, the combination of a materials-receptacle, of a moving agitator for the material in the receptacle, and means for imparting to said agitator a tremulous movement during its agitating movement.

17. In a depositing-machine, the combination of a materials-receptacle, a cylinder and its piston, and an agitator in the receptacle, of means for imparting a tremulous movement to the piston, and means for actuating the agitator from the piston-actuating means, whereby said agitator also has a tremulous movement.

18. In a depositing-machine, the combination with a receptacle, a cylinder, its piston, piston-operating means, and a discharge-port, of means alternately connecting the receptacle and cylinder, and the cylinder and discharge-port, and means for producing relative vibration between the cylinder and piston during the discharge movement thereof.

19. In a depositing-machine for such materials as chocolate and the like, the combination of a material-receptacle having a discharge-port and means for discharging the material therefrom, of means imparting a tremulous movement to the material in the receptacle.

20. In a depositing-machine for such materials as chocolate and the like, the combination of a material-receptacle, a piston and a cylinder for withdrawing portions of the contents of said receptacle and discharging the same, and means for imparting a tremulous motion to the material in the receptacle.

21. In a depositing-machine, the combination with a receptacle, a cylinder, its piston, piston-operating means, and a discharge-port, of means for alternately connecting the receptacle and cylinder and the cylinder and discharge-port, and means for vibrating the piston during its intake movement.

In testimony whereof I affix my signature in presence of two witnesses.

ALEXANDER W. COPLAND.

Witnesses:
H. C. SMITH,
ED. D. AULT.